(12) United States Patent
Squyres

(10) Patent No.: US 7,357,610 B2
(45) Date of Patent: Apr. 15, 2008

(54) SECURING DEVICE FOR CARGO RESTRAINING APPARATUS

(75) Inventor: Jerrell P. Squyres, Farmers Branch, TX (US)

(73) Assignee: JPS Corporation, Dallas, TX (US)

( * ) Notice: Subject to any disclaimer, the term of this patent is extended or adjusted under 35 U.S.C. 154(b) by 277 days.

(21) Appl. No.: 11/145,101

(22) Filed: Jun. 3, 2005

(65) Prior Publication Data

US 2005/0226698 A1   Oct. 13, 2005

Related U.S. Application Data

(62) Division of application No. 10/749,082, filed on Dec. 30, 2003, now Pat. No. 6,935,819.

(51) Int. Cl.
*B60P 7/08*   (2006.01)

(52) U.S. Cl. ..................... 410/104; 410/118; 410/130; 410/139

(58) Field of Classification Search ........ 410/104–106, 410/116–118, 130, 132, 135, 139, 141, 142, 410/150; 248/499, 503, 503.1; 24/115 K, 24/265 R, 265 CD
See application file for complete search history.

(56) References Cited

U.S. PATENT DOCUMENTS 5,833,413 A * 11/1998 Cornelius .................... 410/119
6,935,819 B2 * 8/2005 Squyres ....................... 410/104

* cited by examiner

*Primary Examiner*—Stephen Gordon
(74) *Attorney, Agent, or Firm*—Vincent J. Allen; Carstens & Cahoon, LLP

(57) ABSTRACT

A device for securing cargo restraining apparatus on a wall of a cargo receptacle is comprised of a body member adapted for slidable engagement with an elongated track on the wall; an attachment member for attaching the body member to the cargo restraining apparatus; and first and second trigger members at respective opposed ends of the body member. The first and second trigger members are adapted to engage respective complementary portions of the track to inhibit sliding movement of the body member along the track when both of the first and second trigger members are engaged with the track, such that the body member is slidable only in one direction when the first trigger member is disengaged from the track and the second trigger member is engaged with the track and is slidable only in an opposite direction when the second trigger member is disengaged from the track and the first trigger member is engaged with the track. The first and second trigger members have respective beveled surfaces to facilitate disengagement of the first and second trigger members from the track.

14 Claims, 7 Drawing Sheets

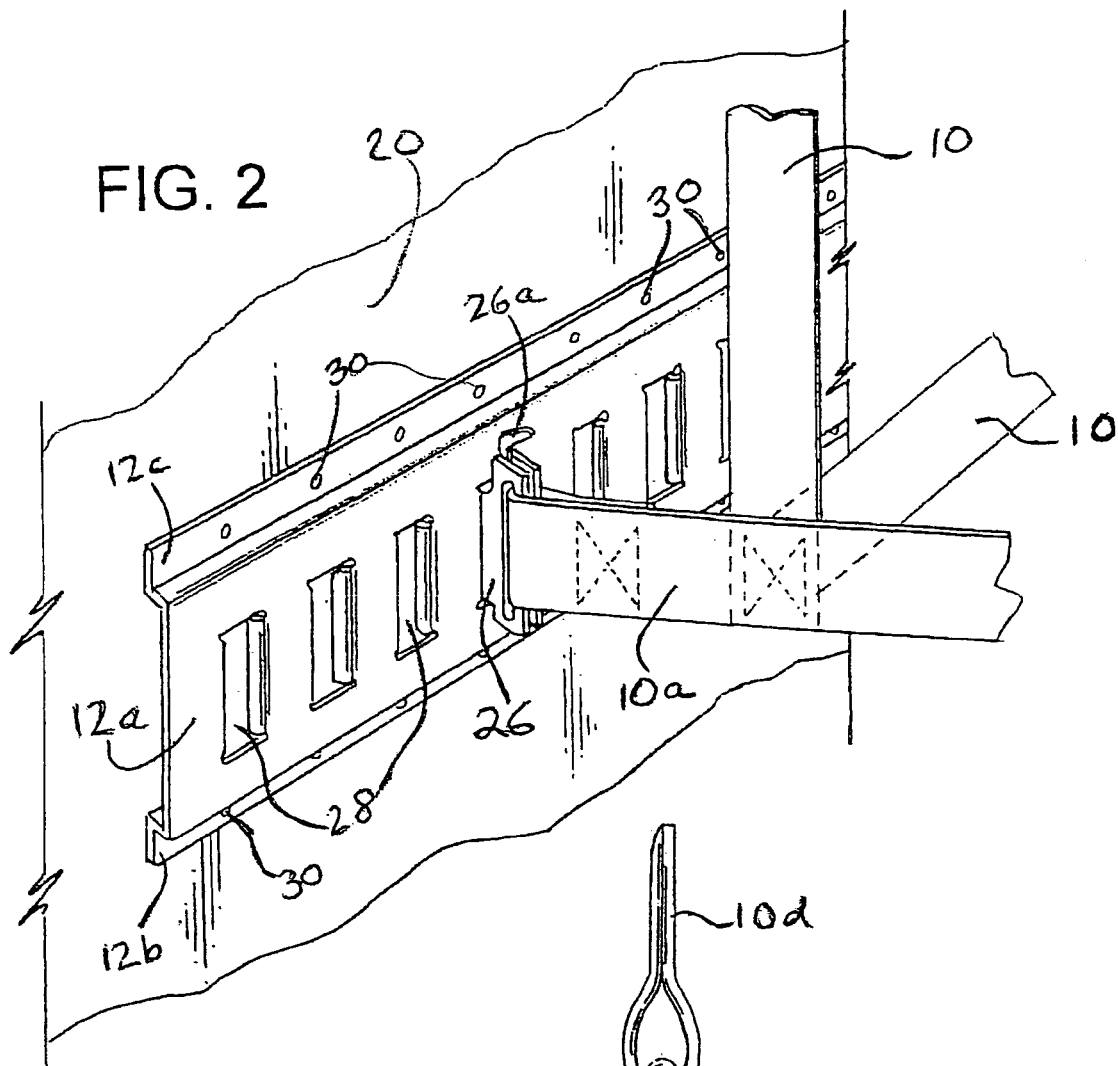
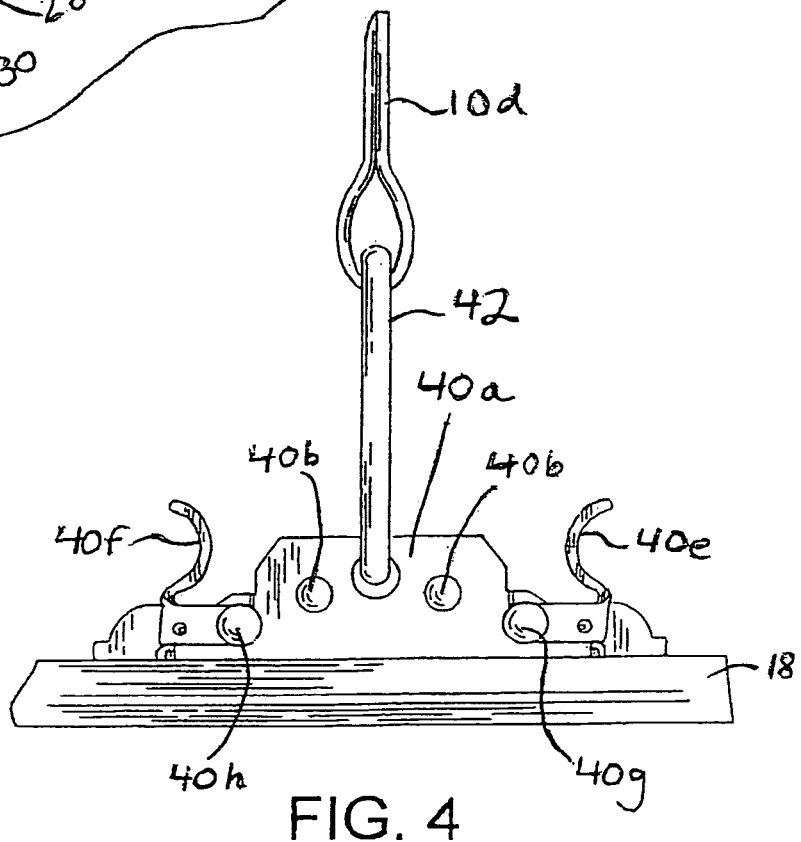

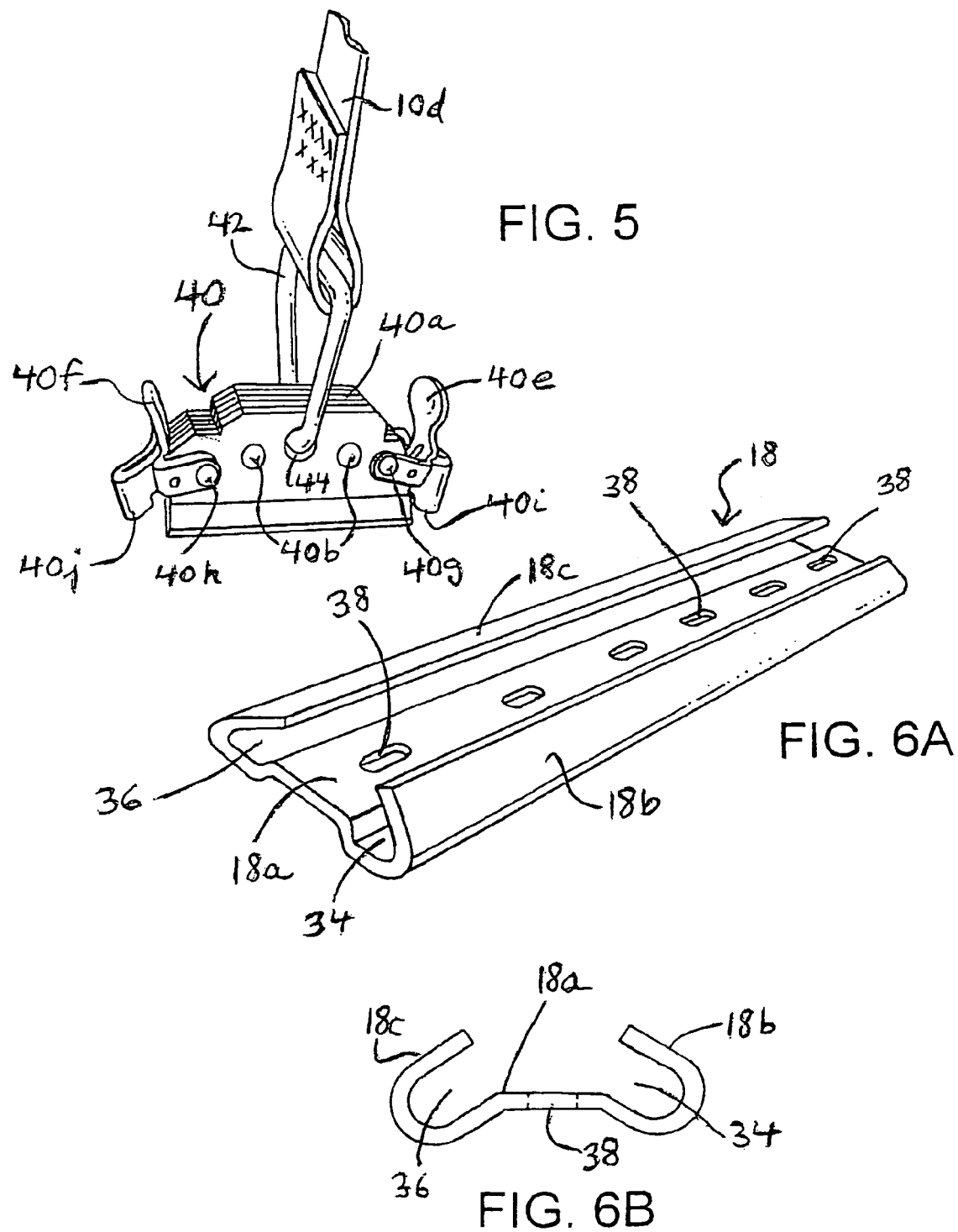

SECURING DEVICE FOR CARGO RESTRAINING APPARATUS

This is a divisional application and claims the benefit of and priority to U.S. patent application Ser. No. 10/749,082 filed on Dec. 30, 2003 and issued as U.S. Pat. No. 6,935,819 on Aug. 30, 2005, the disclosure of which is incorporated herein by reference.

TECHNICAL FIELD

This invention relates generally to cargo restraining apparatus used in cargo receptacles, such as, for example, in the interior of a truck or other vehicle, and in particular to a device for securing cargo restraining apparatus in the cargo receptacle.

BACKGROUND ART

Cargo restraining apparatus of various types are known in the art. Typically, such apparatus is used within a cargo receptacle, such as, for example, within a truck body, to restrain the cargo from excessive movement within the receptacle. One type of restraining apparatus is comprised of one or more beams, which partition the cargo load and/or form supporting joists for vertically-spaced decking structures extending between opposed walls of the truck body.

Another type of cargo restraining apparatus is comprised of one or more synthetic straps or a web of straps forming a net that spans between the opposed walls of the cargo receptacle. Typically, the straps or net is anchored at four locations on the walls to define a four-cornered, generally rectangular restraining apparatus. The anchoring locations are adjustable, depending on the amount and location of the cargo. One problem with such cargo straps or nets is that they are easily removable from the cargo receptacle and are subject to theft, loss and damage. Accordingly, there is a need for a securing device for cargo restraining straps and nets.

SUMMARY OF THE INVENTION

In accordance with the present invention, a device for securing cargo restraining apparatus in a cargo receptacle is comprised of a body member adapted for slidable engagement with an elongated track in the receptacle: an attachment member for attaching the body member to the cargo restraining apparatus; and first and second trigger members at respective opposed ends of the body member. In accordance with one aspect of the invention, the first and second trigger members are adapted to engage respective complementary portions of the track to inhibit sliding movement of the body member along the track when both the first and second trigger, members are engaged with the track, such that the body member is slidable only in one direction when the first trigger member is disengaged from the track and the second trigger member is engaged with the track and is slidable only in an opposite direction when the second trigger member is disengaged from the track and the first trigger member is engaged with the track.

In accordance with one embodiment of the invention, the first and second trigger members have respective beveled surfaces to facilitate disengagement of the first and second trigger members from the track.

In accordance with another embodiment of the invention, the securing device further includes a retaining member for retaining the body member in slidable engagement with the track.

In accordance with yet another embodiment of the invention, the body member has a hole extending transversely therethrough. The attachment member is comprised of a ring member that extends through the hole and is adapted to extend through a complementary opening in the cargo restraining apparatus.

In accordance with still another embodiment of the invention, the track has plural slots at predetermined intervals therealong. The first and second trigger members are adapted to matingly engage respective ones of the track slots.

In accordance with a yet another embodiment of the invention, the track has a base portion and first and second ears depending from respective opposed sides of the base portion in converging relationship to define respective first and second grooves. The body member has first and second flanges depending from respective opposed sides thereof. The first and second ears are adapted to capture the first and second flanges within the respective first and second grooves to limit movement of the body member to sliding movement along the track when the body member is engaged with the track.

In accordance with still another embodiment of the invention, the base portion of the track includes a central hump between the first and second grooves. The openings are spaced along the central hump. The central hump provides a raised portion to facilitate mating engagement between the first and second trigger members and the corresponding slots.

In accordance with the present invention, when the track extends substantially the entire distance between opposed walls of the cargo receptacle and the securing device is in slidable engagement with the track, a cargo restraining apparatus that is relatively permanently attached to the securing device is effectively secured within the cargo receptacle.

BRIEF DESCRIPTION OF DRAWINGS

FIG. 2 is a detailed, perspective view of one corner of the cargo restraining net, showing the attachment thereof to one of the four tracks shown in FIG. 1;

FIG. 4 is an elevation view of a device for securing the cargo restraining net, in accordance with the present invention;

FIG. 5 is a perspective view of the securing device of FIG. 4;

FIG. 6A is a perspective view of an anchoring track in accordance with the present invention;

FIG. 6B is an end elevation view of the anchoring track of FIG. 6A;

BEST MODE FOR CARRYING OUT THE INVENTION

In the description which follows, like parts are marked throughout the specification and drawings with the same respective reference numbers. The drawings are not necessarily to scale and in some instances proportions may have been exaggerated in order to more clearly describe the best mode for carrying out the invention.

Figure 1:
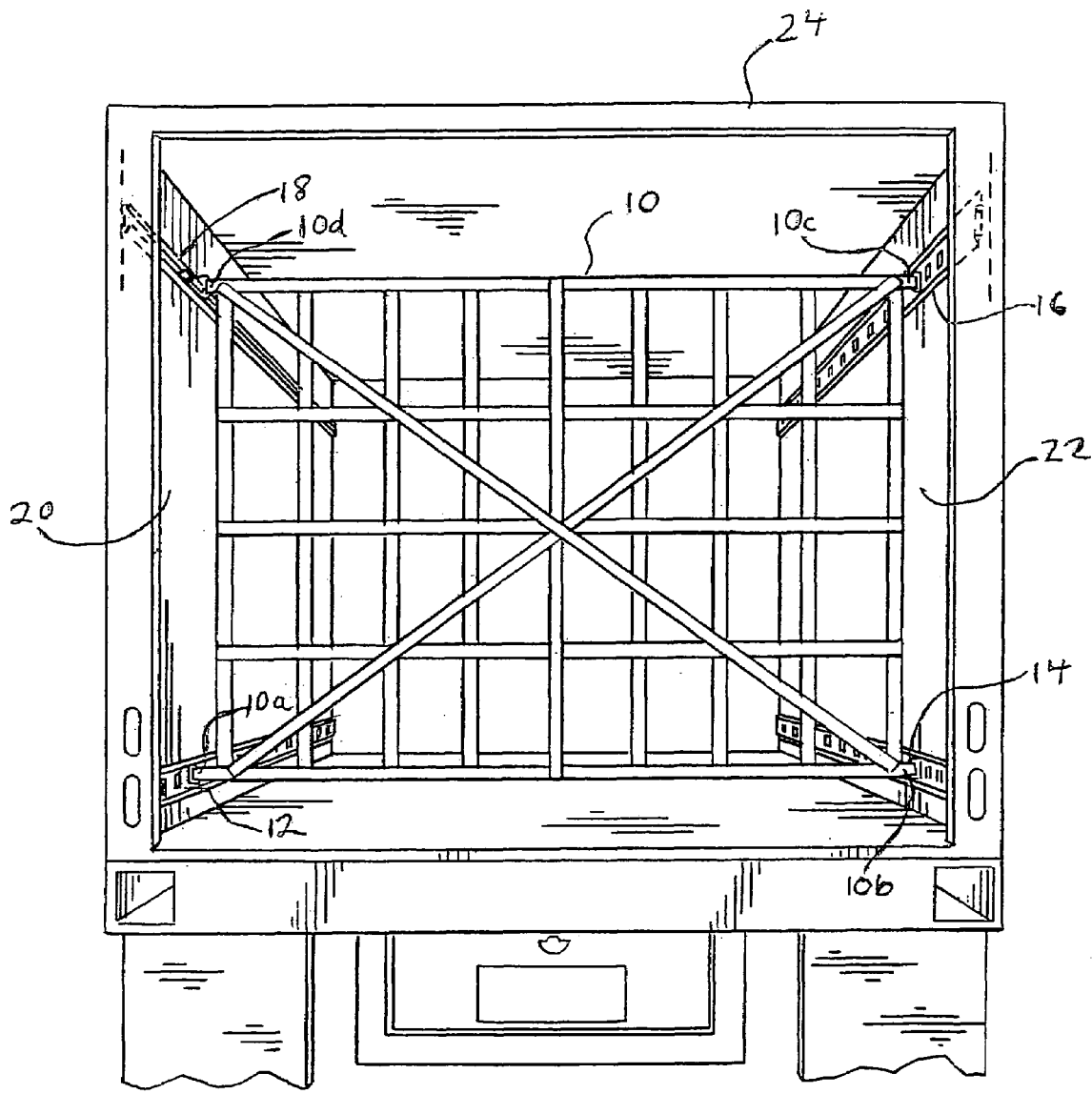
FIG. 1 is an elevation view of the interior of a cargo receptacle, showing a cargo restraining net attached at four corners thereof to respective four anchoring tracks on the interior walls of the cargo receptacle.

Referring to FIG. 1, a cargo restraining net 10 is comprised of a generally rectangular web of straps made of a synthetic material. Net 10 is removably attached at each of its four corners to a corresponding elongated metal track 12, 14, 16 or 18 mounted on a corresponding side wall 20 or 22 of a cargo receptacle 24. The cargo receptacle 24 shown in FIG. 1 is the interior of a transport vehicle, such as a truck. However, one skilled in the art will appreciate that the present invention has application in various types of cargo receptacles, including, but not limited to, transport vehicles. Tracks 12 and 18 are mounted on wall 20 and tracks 14 and 16 are mounted on wall 22, which is on the opposite side of cargo receptacle 24 from wall 20. Each corner of net 10 has an attachment device for attaching the corresponding corner to a corresponding track 12, 14, 16 or 18, as will be described in greater detail hereinbelow. Net 10 is depicted in its operational position in FIG. 1, wherein net 10 spans substantially the entire height and width of receptacle 24 for restraining excessive movement of cargo (not shown) therein. Each track 12, 14, 16 and 18 has plural slots spaced along the corresponding track for receiving the corresponding attachment device, whereby net 10 is positionable at various locations along walls 20 and 22.

Referring also to FIG. 2, the attachment of net 10 to track 12 on a lower part of wall 20 is shown in detail. An attachment device 26 is provided for removably attaching a corner strap 10a of net 10 to track 12. Device 26 has an elongated opening through which corner strap 10a is laced. Corner strap 10a is then doubled back on itself and the tag end thereof is secured, preferably by sewing, to form a permanent loop at the end of corner strap 10a and secure corner strap 10a to attachment device 26. Attachment device 26 is preferably made of a metal material and includes a spring-loaded trigger 26a, which biases a portion of attachment device 26 into mating engagement with one of a plurality of generally rectangular slots 28 spaced alone track 12, as shown in FIG. 2. Each slot 28 is elongated along a vertical axis. Manual operation of trigger 26a against the spring bias allows attachment device 26 to be disengaged from the corresponding slot 28 when it is desired to remove the corresponding corner of net 10 from wall 20 or to reposition that corner of net 10 along wall 20.

Track 12 is preferably a standard "E type" mounting track typically used in cargo receptacles, such as in the interior of truck bodies. Track 12 has a raised central portion 12a in which slots 28 are formed and flange portions 12b, 12c on respective opposed sides of central portion 12a. Flange portions 12b and 12c have plural holes spaced therealong for receiving respective mounting members 30, such as screws, whereby track 12 is mounted on wall 20. Although not shown in detail, tracks 14 and 16 are identical to track 12 and corner straps 10b and 10c are removably attached to respective tracks 14 and 16 by means of attachment devices that are identical to attachment device 26 described hereinabove.

Figure 3:
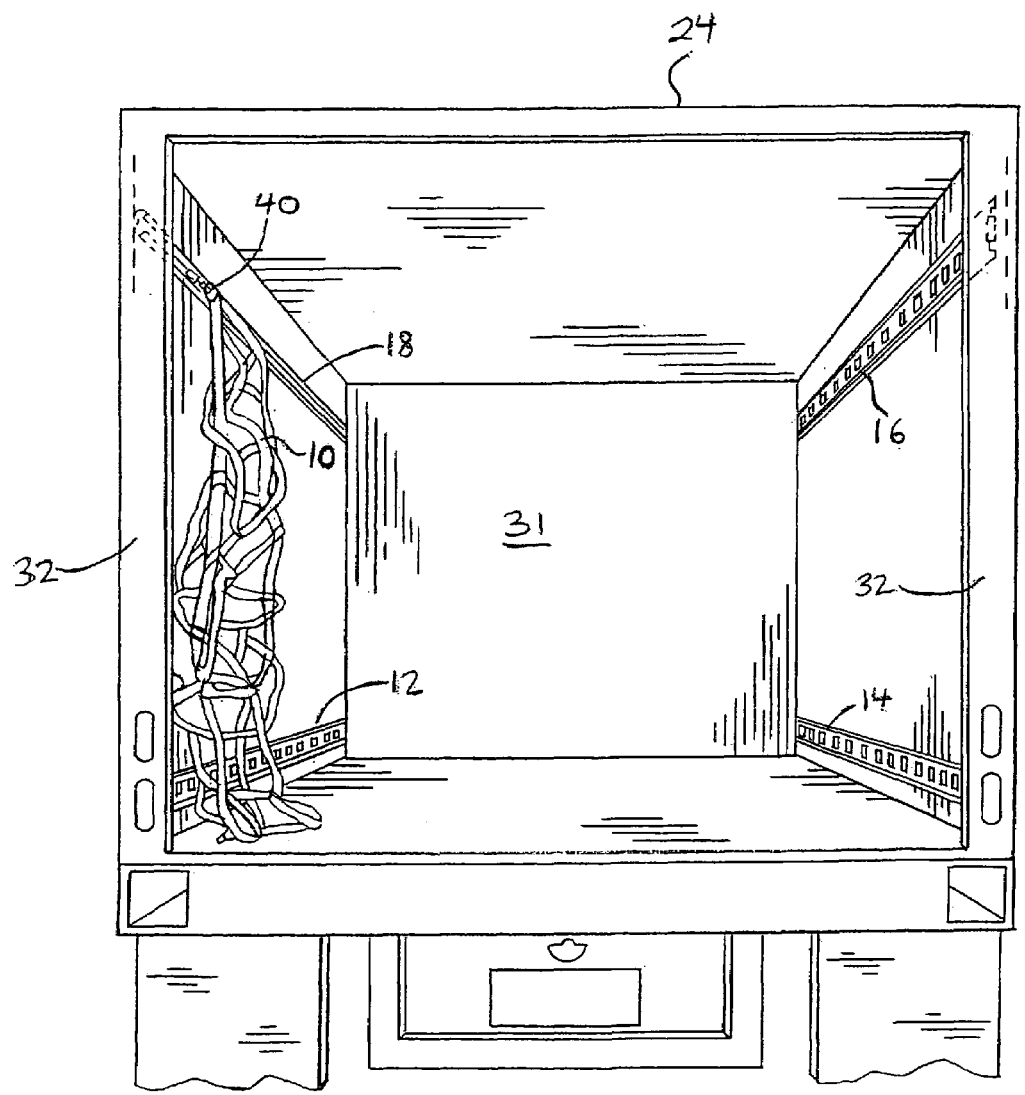
FIG. 3 is an elevation view of the interior of the cargo receptacle of FIG. 1, showing the cargo restraining net disengaged from three of the four tracks.

In accordance with the present invention, a fourth track 18, which is mounted on an upper part of wall 20, has a different structure from the other three tracks 12, 14 and 16, as can be best seen in FIGS. 6A and 6B. Referring to FIGS. 3, 6A and 6B, track 18 extends along wall 20 substantially the entire distance between a front wall 31 of receptacle 24 and a rear wall 32 thereof. Rear wall 32 is partially defined by an access panel (not shown), which can be opened to allow access to the interior of receptacle 24, as shown in FIGS. 1 and 3. When the access panel is closed, it defines a solid rear wall 32 to fully enclose the interior of receptacle 24.

Track 18 is an elongated metal track comprised of a base portion 18a and two ears 18b, 18c depending from respective opposed sides of base portion 18a in converging relationship to define two elongated grooves 34, 36. Base portion 18a defines a central hump having plural generally elliptical slots 38 spaced therealong. The respective major axes of slots 38 are aligned along a longitudinal axis of track 18.

In FIG. 3, net 10 is shown hanging down after three of the four corners thereof have been disengaged from respective tracks 12, 14 and 16. However, the fourth corner is not disengageable from track 18 to prevent net 10 from being removed from receptacle 24. The attachment device by which net 10 is relatively permanently attached to track 18 will now be described with reference to the remaining FIGS. 4, 5, 7A-D and 8, as well as with reference to FIGS. 1, 3, 6A and 6B.

An attachment device 40 is provided to secure one corner of net 10 in relatively permanent engagement with track 18. Device 40 has a different configuration from the attachment devices 26 used to attach the other three corners of net 10 to tracks 12, 14 and 16. Device 40 has a body member 40a comprised of plural metal plates in abutting relationship and held together by suitable connectors, such as rivets 40b. As can be best seen in FIG. 8, device 40 further includes flanges 40c, 40d depending from respective opposed sides of body member 40a. First and second spring-loaded trigger members 40e, 40f are pivotally mounted at respective opposed ends of body member 40a by means of suitable mounting members, such as pins 40g, 40h. A "D" ring 42 extends through a central hole 44 in body member 40a. Corner strap 10d is laced through "D" ring 42 and doubled back on itself and the tag end is secured, preferably by sewing, to define a permanent loop, whereby corner strap 10d is secured to device 40, as can be best seen in FIG. 5.

Figure 7A:
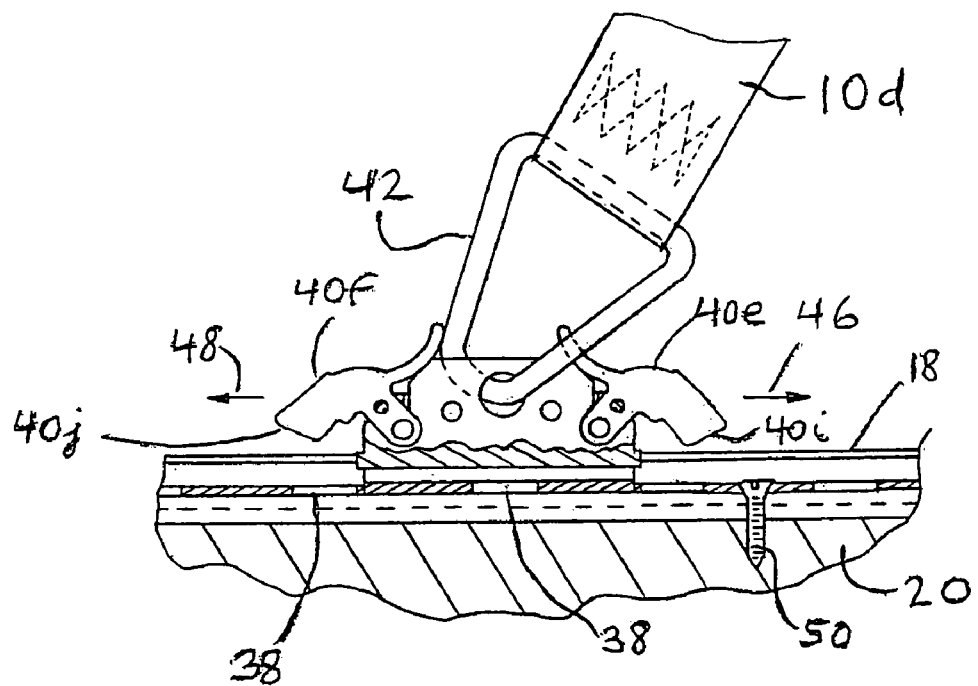
FIG. 7A is an elevation view of the securing device of FIG. 4 in slideable engagement with the anchoring track of FIG. 6A, showing bi-directional movement of the device along the track.
Figure 7B:
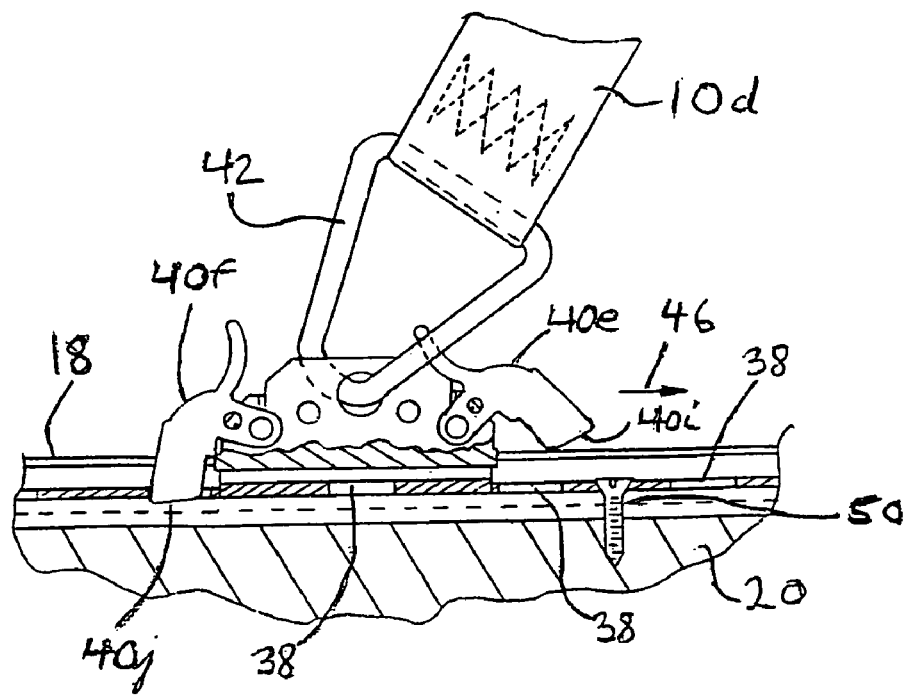
FIG. 7B is an elevation view of the securing device of FIG. 4 in slideable engagement with the anchoring track of FIG. 6A, showing movement of the device along the track in one direction.
Figure 7C:
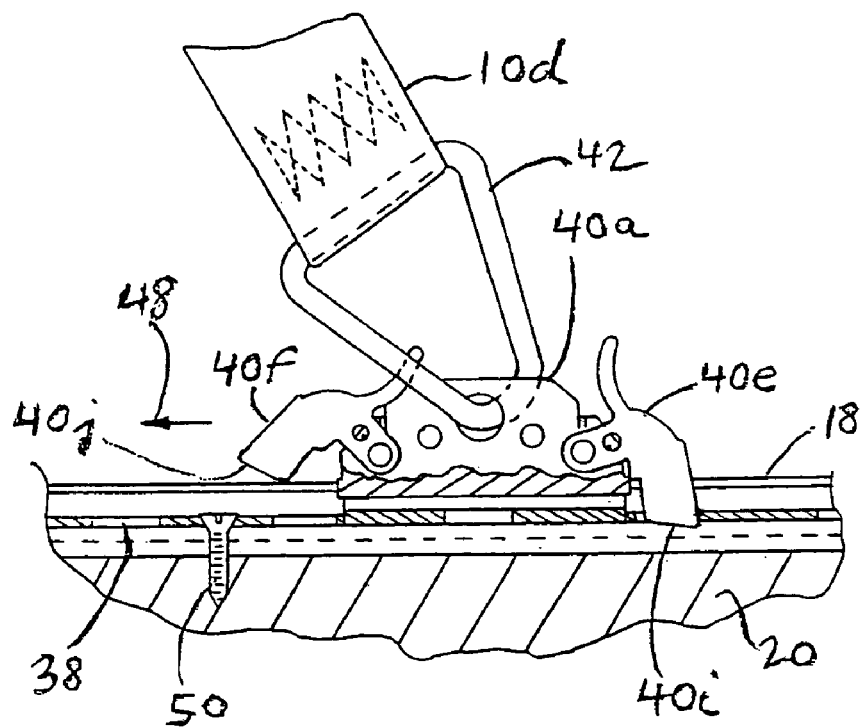
FIG. 7C is an elevation view of the securing device of FIG. 4 in slideable engagement with the anchoring track of FIG. 6A, showing movement of the device along the track in an opposite direction from the direction shown in FIG. 7B.

Trigger members 40e and 40f are adapted to matingly engage slots 38 in track 18, as shown in FIG. 4. Trigger members 40e and 40f are spring biased into mating engagement with corresponding slots 38. The raised hump defined by base portion 18a provides sufficient clearance between track 18 and wall 20 to facilitate mating engagement between trigger members 40e, 40f and the respective slots 38. As can be best seen in FIGS. 5 and 7A-D, the respective lower surfaces 40i and 40j of trigger members 40e and 40f are beveled, to facilitate disengagement of the trigger members from the respective slots 38. As shown in FIG. 8, device 40 is constrained to sliding movement along track 18 when flanges 40c, 40d are captured within respective grooves 34, 36. As shown in FIG. 7A, trigger members 40e, 40f may be manually operated against the spring bias to disengage trigger members 40e, 40f from respective slots 38. When trigger members 40e and 40f are so disengaged, device 40 is moveable in either direction along track 18, as indicated by arrows 46 and 48.

If it is desired to move device 40 in only one direction (i.e., the direction indicated by arrow 46 in FIG. 7B), only trigger member 40e need be manually operated to disengage it from the corresponding slot 38. The beveled lower surface 40j of trigger member 40f allows trigger member 40f to be disengaged from the corresponding slot 38 when device 40 is moved in the direction of arrow 46 without the need to manually operate trigger member 40f.

If it is desired to move device 40 in the opposite direction (i.e. the direction indicated by anew 48 in FIG. 7C), only trigger member 40f need be manually operated to disengage it from the corresponding slot 38. The beveled lower surface 40i of trigger member 40e allows trigger member 40e to be disengaged from the corresponding slot 38 when device 40 is moved in the direction of arrow 48 without the need to manually operate trigger member 40e.

Figure 7D:
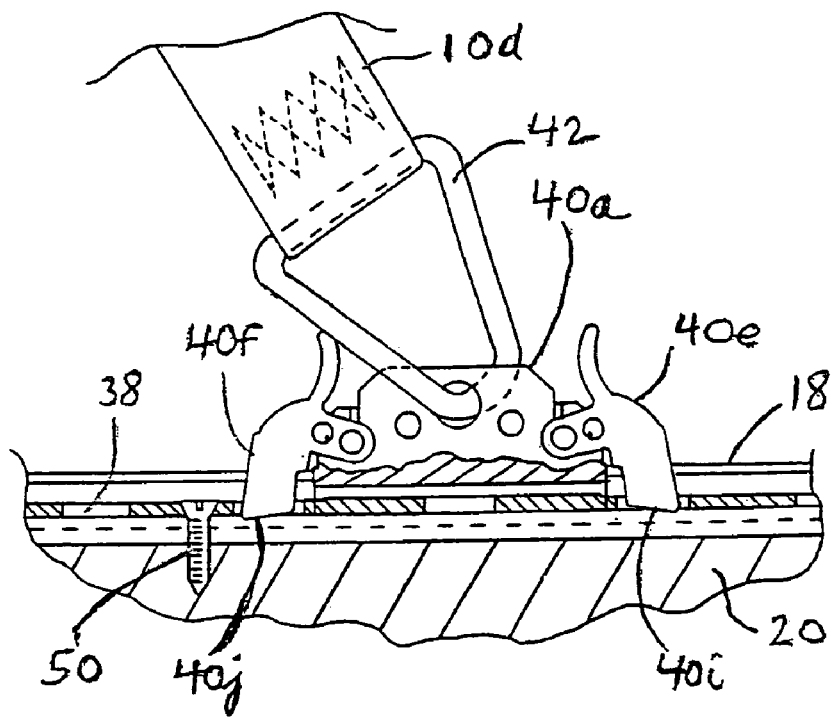
FIG. 7D is an elevation view of the securing device of FIG. 4 in slideable engagement with the anchoring track of FIG. 6A, showing the device secured against movement in either direction along the track.
Figure 8:
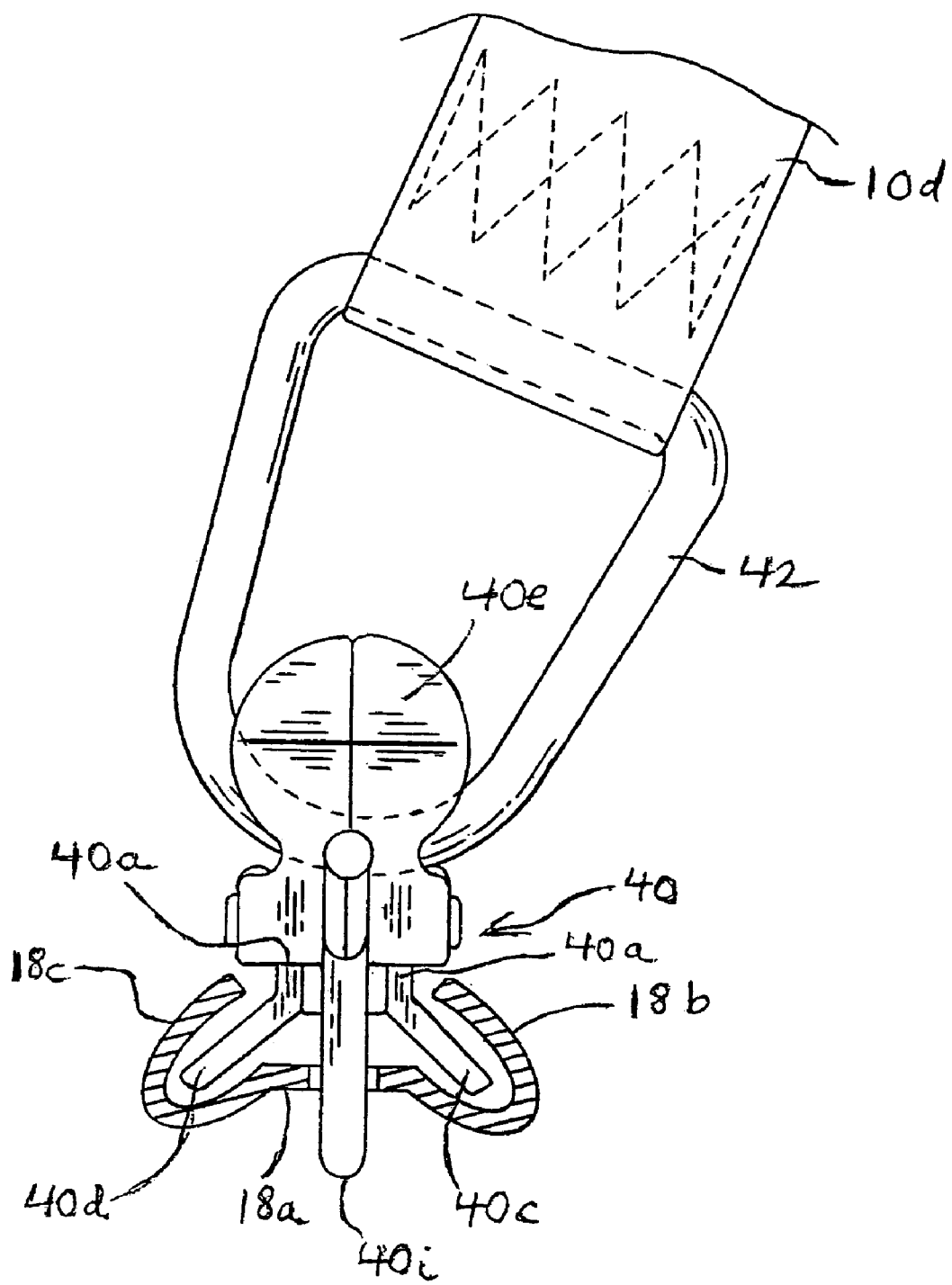
FIG. 8 is an end elevation view of the securing device of FIG. 4 in slideable engagement with the anchoring track of FIG. 6A.

In FIG. 7D, when both trigger members 40e and 40f are in mating engagement with respective slots 38, device 40 is anchored against movement in either direction along track 18. Track 18 is secured to wall 20 by suitable securing members, such as screws 50.

Although the best mode for carrying out the invention has been described hereinabove with reference to a cargo restraining net, one skilled in the art will recognize that the securing device in accordance with the present invention is also adapted to secure other types of cargo restraining apparatus, such as beams and straps. Further, although an enclosed cargo receptacle such as the interior of a truck body is shown in the drawings, the securing device according to the present invention is also adapted for use in a semi-enclosed cargo, receptacle, such as the bed of a pickup truck The securing device is adapted to be captured within a wall-mounted track, whereby the device and the cargo restraining apparatus are free to move along the length of the track, but cannot be removed therefrom. The securing device is further, adapted to be anchored at various positions along the track corresponding to the locations of slots in the track, which are spaced at predetermined intervals (e.g., two inches) along the track, such that the cargo restraining apparatus is positionable at any one of a plurality of predetermined positions along the wall of the cargo receptacle.

The best mode for carrying out the invention has now been described in detail. Since changes in and additions to the above-described best mode may be made without departing from the nature, spirit and scope of the invention, the invention is not to be limited to said details, but only by the appended claims and their equivalents.

The invention claimed is:

1. A device for securing a cargo restraining apparatus on a wall of a cargo receptacle, said device comprising:
   an anchoring member mountable on the wall;
   a body member adapted for slidable engagement with said anchoring member;
   first and second trigger members at respective opposed ends of said body member, said first and second trigger members being adapted to engage respective complementary portions of said anchoring member to inhibit sliding movement of said body member when both of said first and second trigger members are engaged with said anchoring member, said body member being slidable only in a first direction when said first trigger is disengaged from said anchoring member and said second trigger member is engaged with said anchoring member, said body member being slidable only in a second direction when said second trigger member is disengaged from said anchoring member and said first trigger member is engaged with said anchoring member, said second direction being opposite from said first direction; and
   an attachment member for attaching the cargo restraining apparatus to said device.

2. The device of claim 1 wherein said complementary portions of said anchoring member comprise a plurality of slots at predetermined intervals along an elongated track, said first and second trigger members being adapted to matingly engage respective ones of said slots.

3. The device of claim 2 wherein said anchoring member has a base portion and first and second cars depending from respective opposed sides of said base portion in converging relationship to define respective first and second grooves.

4. The device of claim 3 wherein said body member has first and second flanges depending from respective opposed sides of said body member, said first and second ears being adapted to capture said first and second flanges within the respective first and second grooves to limit movement of said body member to sliding movement along said track when said body member is engaged with said anchoring member.

5. The device of claim 3 wherein said base portion includes a central hump between said first and second grooves, said slots being spaced along said central hump.

6. The device of claim 5 wherein said hump is adapted to provide sufficient spacing between said slots and the wall on which said anchoring member is mounted to facilitate mating engagement between said first and second trigger members and respective ones of said slots.

7. The device of claim 2 wherein said slots are generally elliptically shaped, with a major axis aligned along a longitudinal axis of said track.

8. The device of claim 1 wherein said anchoring member comprises an elongated track mountable on said wall, said elongated track having a base portion and first and second ears depending from respective opposed sides of said base portion, said base portion having a plurality of slots at predetermined intervals along said elongated track.

9. The device of claim 8 wherein said first and second ears are configured to limit movement of said body member to sliding movement along said elongated track when said body member is in engagement with said anchoring member.

10. The device of claim 9 wherein said first and second ears depend from said base portion in a converging relationship to define respective first and second grooves.

11. The device of claim 10 wherein said body member has first and second flanges depending from respective opposed sides of said body member, said first and second ears being adapted to capture said first and second flanges within the respective first and second grooves to limit movement of said body member to sliding movement along said track when said body member is engaged with said anchoring member.

12. The device of claim 11 wherein said anchoring member includes a central hump between said first and second grooves, said plurality of slots being spaced along said central hump.

13. The apparatus of claim 1 wherein said body member and said anchoring member are configured to deter removal of said body member from said anchoring member when said anchoring member is attached to said wall.

14. The apparatus of claim 9 further comprising a cargo restraining member attached to said body member to inhibit removal of said cargo restraining member without removal of said anchoring member, said cargo restraining member being adjustably positionable within said cargo receptacle by sliding said body member along said anchoring member.

* * * * *

UNITED STATES PATENT AND TRADEMARK OFFICE
CERTIFICATE OF CORRECTION

PATENT NO.        : 7,357,610 B2                                           Page 1 of 1
APPLICATION NO.   : 11/145101
DATED             : April 15, 2008
INVENTOR(S)       : Jerrell P. Squyres It is certified that error appears in the above-identified patent and that said Letters Patent is hereby corrected as shown below:

Column 6, Line 19, delete the word - "cars"

and replace it with - --ears--

Column 7, Line 5, please correct the claim number:

delete the number - "9"

and replace it with - --1--

Signed and Sealed this

Twenty-sixth Day of August, 2008

JON W. DUDAS
*Director of the United States Patent and Trademark Office*